United States Patent [19]

Micheli

[11] 4,117,058

[45] Sep. 26, 1978

[54] METHOD OF MAKING BORON CONTAINING STRONTIUM FERRITE

[75] Inventor: Adolph L. Micheli, Mt. Clemens, Mich.

[73] Assignee: General Motors Corporation, Detroit, Mich.

[21] Appl. No.: 747,069

[22] Filed: Dec. 3, 1976

[51] Int. Cl.$^2$ ...................... C04B 35/26; C04B 35/64
[52] U.S. Cl. ........................................ 264/65; 264/66; 252/62.58; 252/62.63
[58] Field of Search .......................... 252/62.58, 62.63; 423/594; 264/56, 66, 65, 26; 219/10.55

[56] References Cited

U.S. PATENT DOCUMENTS

| | | | |
|---|---|---|---|
| 1,964,139 | 6/1934 | Pokormy et al. | 75/27 |
| 2,768,427 | 10/1956 | Frehn | 29/182 |
| 2,854,412 | 9/1958 | Brockman et al. | 252/62.63 X |
| 2,920,958 | 1/1960 | Bergh | 75/200 |
| 2,960,470 | 11/1960 | Loosjes et al. | 252/62.63 X |
| 3,469,053 | 9/1969 | Levinson | 219/10.55 |
| 3,585,258 | 6/1971 | Levinson | 264/26 |
| 3,701,872 | 10/1972 | Levinson | 219/10.55 |
| 3,731,037 | 5/1973 | Levinson | 219/10.55 |
| 3,855,374 | 12/1974 | Brailowsky | 252/62.58 X |
| 3,897,355 | 7/1975 | Arendt et al. | 252/62.58 |

FOREIGN PATENT DOCUMENTS 2,107,144 8/1971 Fed. Rep. of Germany.
1,340,503 12/1973 United Kingdom.

OTHER PUBLICATIONS

Fresh "Proceedings of the IRE", pp, 1303–1311, (Oct. 1956).
Allen "Ceramic Industries", pp. 43–45, (Mar. 1970).

Primary Examiner—Jack Cooper
Attorney, Agent, or Firm—Robert J. Wallace

[57] ABSTRACT

An energy-saving method of making boron-containing strontium ferrite magnets. A water-insoluble source of boron oxide, such as ferro-boron, is used as the boron source in the reactant mixture, along with other water-insoluble reactants. The ferrite reactants are dispersed in a water slurry and milled prior to calcining, without concurrently dissolving the source of boron oxide. Accordingly, flash drying of the slurry before calcining is unnecessary. Reactants and water are mechanically separated after milling, leaving a residue stoichiometrically corresponding to the desired composition. Hence, energy and natural gas are conserved. The residue can then be calcined and further processed in any convenient manner.

3 Claims, 1 Drawing Figure

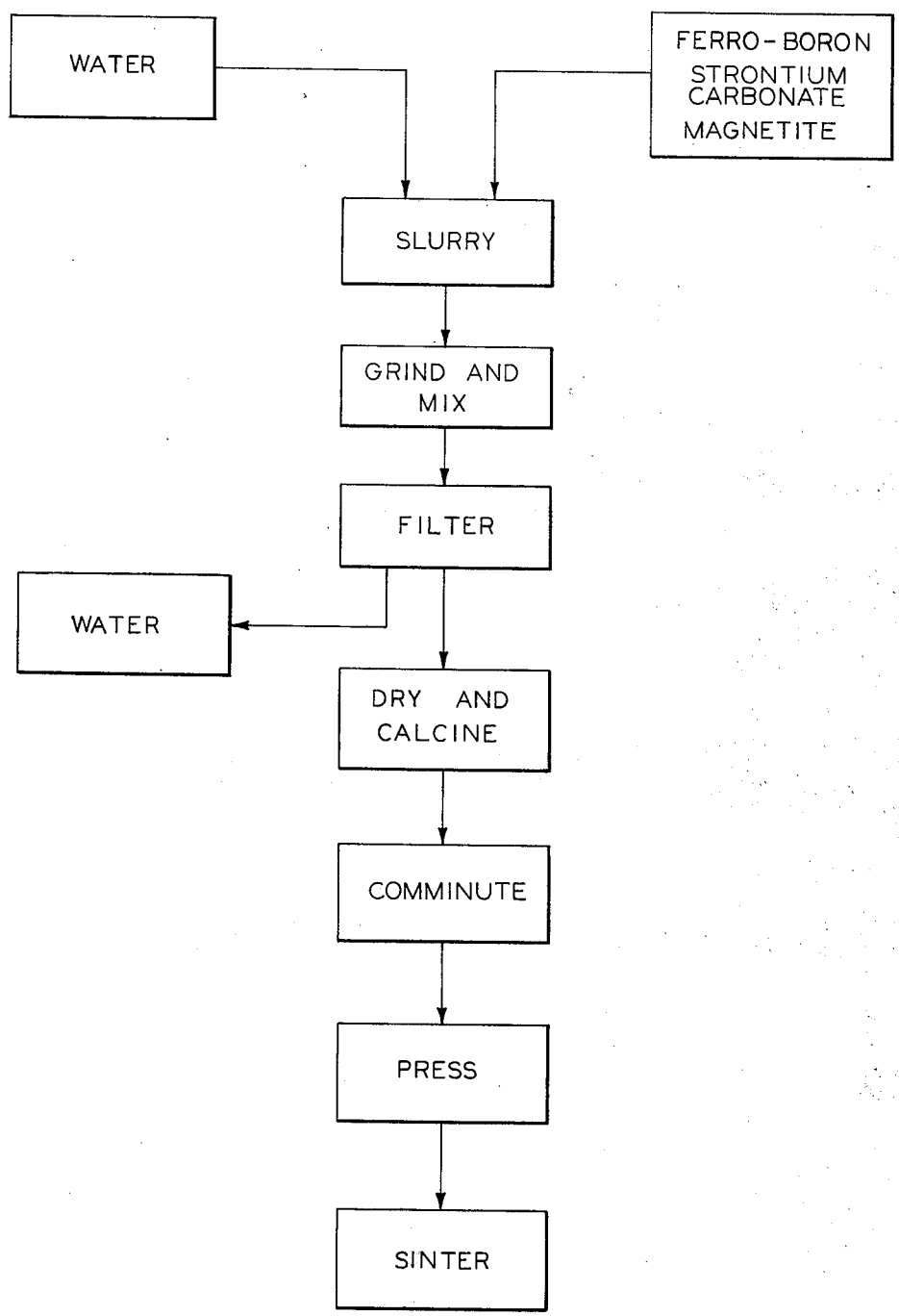

METHOD OF MAKING BORON CONTAINING STRONTIUM FERRITE

BACKGROUND OF THE INVENTION

This invention relates to strontium ferrite permanent magnets and, more particularly, to a more economical and energy-saving method of making high quality boron-containing strontium ferrite permanent magnets.

One technique for making a strontium ferrite permanent magnet is disclosed in U.S. Pat. No. 3,855,374 Brailowsky et al., entitled "Method of Making Magnetically Anisotropic Permanent Magnets", issued Dec. 17, 1974. Normally, high purity ferric oxide of small grain size is used as a starting material to obtain hard ferrite magnets with the highest energy product and coercive force. Brailowsky et al. disclose that high quality strontium ferrite permanent magnets can be made with a low cost natrual magnetite having a relatively large grain size, if a small proportion of boric acid or boric oxide is included in the reactant mixture. Brailowsky et al. disclose milling the low cost iron oxide, strontium carbonate and a minor proportion of boric acid as a water slurry to form a homogeneous mixture. The mixture is dried, screened and tumbled to form a free-flowing powder. The powder is then calcined at about 2100° F. to form a ferrite. The ferrite is comminuted in water to a particle size that is ceramically workable and pressed into a body of desired shape, preferably while under the influence of a directional magnetic field. The pressed body is then sintered at a temperature in the range of 2000° - 2150° F. to form a permanent magnet having the desired high magnetic properties.

During milling in the Brailowsky et al. process the reactants are dispersed in water, typically about 50% by weight water. This water must be removed before calcining. However, it cannot be removed by mechanical separation because the boric acid and/or boric oxide are dissolved in it. Instead, the water is removed by evaporation. However, during slow evaporation the boron compound can segregate nonuniformly. This may require further mixing of the dry material before calcining. To avoid this extra step, the slurry is normally flash dried. Flash drying results in uniform boron compound distribution in the reactant mixture. Removing the water by evaporation, alone, consumes a large amount of energy. For example, starting at room temperature, more than twice the amount of energy is required to evaporate the water in the typical slurry than to calcine the reactants. Moreover, the heat losses in flash drying makes the evaporation energy requirement even greater.

I have recognized that removing the water from the slurry by mechanical means, requires considerably less energy than flash drying. By mechanically removing the water, I mean to separate the water from the reactants without a physical change, a change in state, or a chemical change of either the water or the reactants. If so, considerable energy savings could be achieved. Only a comparatively small amount of heat would be needed to remove remaining moisture after the mechanical separation of water, and it can be applied more efficiently than in flash drying. Thus, natural gas could be conserved.

If an insoluble source of boron oxide is used as a substitute for boric acid and/or boric oxide in the Brailowsky et al process, most of the water in the slurry can be mechanically removed, and flash drying avoided. Ferro-boron is one such source. Ferro-boron is particularly satisfactory since it oxidizes below calcining temperatures and is completely compatible with the other ferrite reactants. While high in cost, such a small proportion is used that a cost savings, due to energy savings, also can be realized. Since the ferro-boron oxidizes at a temperature below normal calcining temperatures, the residue can be calcined and further treated in the normal and accepted manner. No other changes in equipment or process steps are required.

OBJECTS AND SUMMARY OF THE INVENTION

It is, therefore, an object of this invention to provide an energy-saving method of making a boron-containing strontium ferrite magnet.

The invention comprehends substituting a water-insoluble boron oxide source, such as ferro-boron, for boric acid and/or boric oxide in a reactant mixture for a boron-containing strontium ferrite. The reactants are dispersed in water and milled to form a homogeneous mixture. At least 50% of the water is then mechanically separated from the reactants prior to calcining, leaving a residue containing all of the reactants uniformly intermixed. Since all of the components in the reactant mixture are water insoluble, water removal by evaporation is unnecessary. Since segregation of components is not a problem, flash drying is unnecessary. Thus, energy and natural gas are conserved. The residue can then be calcined, ground, screened, pressed and sintered in the usual manner.

BRIEF DESCRIPTION OF THE DRAWING

The drawing shows a flow diagram of an energy-saving process in accordance with this invention.

DESCRIPTION OF THE PREFERRED EMBODIMENTS

My method involves forming a reactant mixture with a water-insoluble source of boron oxide, such as ferro-boron, a water-insoluble source of strontium oxide and magnetite.

The ferro-boron is an excellent water-insoluble source of boron oxide for use in accordance with this invention. Ferro-boron is a composition that is commercially available from Union Carbide and others. It is available in fairly high purity form for use in making special steel alloys. One presently commercially available ferro-boron contains, by weight, 17.5% boron and the balance substantially iron, with a total impurity content less than about 2%. It is completely compatible with the reactant mixture. Both the boron and iron in ferro-boron appear to completely oxidize on heating in air at calcining temperatures, to produce boron oxide and iron oxide, in situ. The rate of oxidation is sufficiently rapid to permit the boron oxide to produce its intended effect on the other components in the mixture. It is expected that ferro-boron of considerably lesser purity could be used. Impurity contents of up to about 2%, by weight, would apparently not be objectionable. In view of this, and the small proportion used, impurity contents up to about 5%, by weight, and greater may even be tolerable.

The precise composition of the ferro-boron is not critical. Any of the commercially available ferro-boron compositions containing approximately 15 - 20%, by weight, boron and the balance iron can be used. It is expected that all boron proportions in the ferro-boron above and below this range could be used too. Lesser boron proportions may even be desired to permit wider tolerance in making the ferro-boron addition under commercial production conditions. Higher boron proportions may be preferred if the cost per unit weight of the ferro-boron is about the same. Further, it is contemplated that pure boron can be used to obtain the benefits of this invention. However, pure boron is quite expensive and there is a substantially narrower weight tolerance in using it. Thus, it does not appear as attractive for commercial production use. I also recognize that the water-insoluble source of boron oxide need not even be a metal. It could be a mineral, an inorganic nonmetallic substance, provided the mineral does not contain excessive proportions of undesirable impurity elements.

The quantity of the boron oxide source used in this invention will vary, depending on its boron content. It should be used in a quantity that is equivalent to about 0.3-1.5% by weight boric acid, in the reactant mixture, as taught by Brailowsky et al. This is equal to 1-5 mol percent boron in the reactant mixture. For ferro-boron containing 17.5%, by weight, boron and the balance substantially iron, when mixed with substantially pure magnetite and strontium carbonate, this amounts to about 0.3 to 1.5%, by weight, ferro-boron.

Any water-insoluble source of the bivalent metal oxide, strontium oxide, can be used in the reactant mixture, such as oxides or carbonates of strontium. It should be used in a quantity that is equivalent to the proportion of strontium oxide desired in the finished ferrite. In general, it is desired to produce a magnetoplumbite crystal structure in which the proportions of ferric oxide to strontium oxide are about 5-6 to 1, respectively. In a ratio of 6 to 1, the resultant magnetoplumbite structure has an empirical formula of $SrO \cdot 6Fe_2O_3$.

Brailowsky et al describe that the boron oxide addition permits an improved strontium ferrite to be obtained even with a low cost, large grain size natural iron oxide. They refer to it as Meramec iron oxide. It is chiefly magnetite and is a product of the Meramec Mining Company and is a technical grade iron oxide normally containing 93.02% $Fe_3O_4$, 6.15% $Fe_2O_3$, 0.1% silicon, 0.06% vanadium, and less than 0.002% titanium. It has a grain size on the order of 50 microns. I prefer to use a magnetite such as this in practicing this invention.

Serving as one specific example of my process, 638.0 grams of Meramec iron oxide, 110.2 grams of strontium carbonate, and 6.5 grams of ferro-boron containing 17.5%, by weight, boron comprise the reactant mixture. They are placed in a ball mill mixing drum of about one-half gallon capacity. About 750 grams of water is added to the mixing drum to form a slurry containing about 50%, by weight, water. About 1 quart of balls ranging in size from ⅛ inch to ½ inch diameter are then added to the mixing drum for milling and mixing the slurry. The slurry is then ground and blended in the ball mill until the particles in the reactant mixture have a size less than about 2 microns. The slurry usually must be milled for about 20 to 40 hours. The time of milling, of course, depends upon the coarseness of the reactant mixture with which one starts, and the maximum particle size preferred for calcining. Both can vary, as with any other ferrite manufacturing process. For best results, I prefer to mill down to a maximum particle size of less than about 5 microns.

After milling, the mixture is suction filtered to remove most of the water in the slurry, leaving a moist, or semi-dry, filter cake. The filter cake is substantially identical in composition to the reactants in the slurry, and stoichiometrically corresponds to the ferrite product to be made. Depending on the filtration technique used, the moist filter cake of reactants may contain up to about 10%, by weight, water, preferably less than 5%. The filter cake is then dried, screened and calcined. After calcining, it is ground, magnetically oriented and briquetted, and then sintered. The cake can be processed in these following steps according to the procedures normal and accepted for any ferrite. These following steps are no more material to this invention than in processing any other ferrite.

Drying of the moist filter cake can be accomplished at any rate and at any temperature. It can be dried in situ in the suction filter by drawing dry air through it. If desired, the air can be warm, about 50°-100° C., to accelerate the drying process. On the other hand, one can simply crumble the filter cake and allow it to dry in room air at room temperature for calcining at a later date. Still further, the moist filter cake can be placed in a calcining oven while still moist, in crumbled or uncrumbled, screened or unscreened, form and directly calcined. The initial period of calcining will dry it. Hence, no separation apparatus, handling or attendant time delay need be incurred.

Calcining can then be accomplished in the normal and accepted manner, as well as the following steps of grinding, magnetically pressing, and sintering. They can be performed as described by Brailowsky et al. in the aforementioned U.S. Pat. No. 3,855,374. As for example, a dry crumbled or screened filter cake can be calcined at 1100° C. for 2 hours in a flowing air atmosphere. In general, calcining at 1000-1200° C. will be satisfactory. The calcined ferrite is then comminuted in about 45 to 48%, by weight, water for 30 hours in a one-half gallon ball mill drum with an equal number of ⅜ inch and ¼ inch stainless steel balls. The resultant slurry has a particle size of about 1-2 microns. It is pressed in a directional magnetic field, allowing the water to be exuded from the die, into a product having a density of about 2.75 grams per cubic centimeter. Any pressure sufficient to form a briquette density of at least about 2.0 grams per cubic centimeter can be used. The product is sintered at about 1040-1200° C. for 30 minutes. Sintering temperatures up to 1300° C. and even higher can be used, with correspondingly shorter times. In general, one can sinter by heating at a temperture in excess of about 1000° C. for about 15 to 60 minutes. The sintered ferrite product is then magnetized or, if desired, magnetized at a later date. Magnetization can be done in any of the usual procedures applied to ferrite products made by other processes.

Also, the moist filter cake can be dried and calcined by microwave heating, such as described in the copending United States patent application Ser. No. 747,068, filed concurrently herewith, in the names of Micheli et al and which is entitled "Method of Making Strontium Ferrite Magnets". With microwave heating, an even further cost and energy savings can be realized, particularly if the drying and calcining are performed in a single heating operation in a microwave oven with a flowing air atmosphere. The use of magnetite as the iron oxide source in the reactant mixture makes microwave calcining feasible. Calcining is still done at 1100° C., but the overall time of heating, including drying the moist filter cake, is shorter than for a gas fired oven. The calcine is broken up and comminuted in about 50% by weight water in a ball mill to form a slurry having a maximum particle size of about 2 microns. In general, a particle size less than 5 microns would be useful and particle sizes of about 1 micron or less are desired. However, as with other ferrite manufacturing processes, the resultant particle size can be varied widely. A portion of the slurry is then placed in a die and compressed in any of the known and accepted ways. For example, it can be compressed under a pressure of about 4000 psi, while under the influence of an orienting magnetic field. During the pressing, slurry water is exuded from the die and a briquette of the calcine is formed containing only a nonimal amount of water. The briquette is then sintered in a microwave oven within a temperture range of about 1100° to 1300° C., preferably about 1200° C., for up to about 30 minutes. As is usual, the briquette particle size, briquetting pressure, sintering time, and sintering temperature can be varied to obtain predetermined strontium ferrite magnet characteristics.

The specific details of milling the reactants and the calcine are no more material to this invention than to any other ferrite manufacturing process. Ball milling is convenient but an attritor mill can be used too. In fact, if extremely fine particle sizes are desired, the latter is preferred. Any apparatus and technique can be used that will provide a homogeneous mixture of a preselected particle size in the slurry.

Mechanical separation of the reactants from their water carrier prior to calcining can be done by gravity filtration, pressure filtration, and suction filtration. However, for larger particle sizes, one may find sedimentation and decantation techniques useful, alone or in combination with one of the filtration techniques mentioned. For extremely fine particle sizes, one may choose to use centrifugal separation techniques. Analogously, one may prefer to use centrifugal separation alone or in combination with one or more of the aforementioned other mechanical separation techniques. Further, it may even be advantageous to recycle the water media used in milling, to obtain even further resource and cost savings.

I claim:

1. An energy-saving method of making a boron-containing strontium ferrite having a magnetoplumbite crystal structure and an empirical formula of about $SrO \cdot 6Fe_2O_3$, comprising the steps of:
    forming a mixture of water and ferro-boron, a water-insoluble source of strontium oxide, and magnetite in substantially stoichiometric proportions corresponding to said boron-containing strontium ferrite, said ferro-boron providing a boron content equivalent to about 0.3 to 1.5% by weight boric acid;
    concurrently grinding and blending said mixture to form a homogeneous slurry;
    mechanically separating at least 50% of said water from said mixture to yield a uniformly blended residue of strontium ferrite reactants that retains stoichiometry, boron content, and uniform boron distribution of said mixture;
    heating said residue in an oxidizing atmosphere to remove the balance of said water and to calcine said reactants;
    comminuting the calcined residue;
    compressing at least a portion of the calcined and comminuted residue to form a briquette; and
    sintering the briquette to form a boron-containing strontium ferrite magnet.

2. An energy-saving method of making a boron-containing strontium ferrite having a magnetoplumbite crystal structure and an empirical formula of about $SrO \cdot 6Fe_2O_3$, comprising the steps of:
    forming a mixture of water and ferro-boron, a water-insoluble source of strontium oxide and magnetite in substantially stoichiometric proportions corresponding to said boron-containing strontium ferrite in which said ferro-boron provides a boron content equivalent to about 0.3 to 1.5% by weight boric acid;
    concurrently grinding and blending said mixture to form a homogeneous slurry in which each of said ferro-boron, said source of strontium oxide and said magnetite remains undissolved in said water;
    mechanically separating at least 50% of said water from said mixture to yield a residue of reactants for said boron-containing strontium ferrite in which stoichiometry of said mixture is retained and boron content is not segragated;
    heating said residue in an oxidizing atmosphere to dry and to calcine said reactants;
    comminuting said calcined residue to a particle size less than about 5 microns;
    compressing at least a portion of the calcined and comminuted residue to form a briquette; and
    sintering the briquette to form a boron-containing strontium ferrite magnet.

3. An energy-saving method of making a boron-containing strontium ferrite having a magnetoplumbite crystal structure and an empirical formula of about $SrO \cdot 6Fe_2O_3$, comprising the steps of:
    concurrently grinding and mixing in water strontium carbonate, magnetite and about 0.3 to 1.5% by weight ferro-boron in stoichiometric proportions corresponding to said boron-containing strontium ferrite to form a homogeneous slurry, said ferro-boron having about 15 to 20% by weight boron and the balance iron;
    filtering said slurry to separate at least 50% of said water from said strontium carbonate, magnetite and ferro-boron to yield a uniformly mixed residue which retains said stoichiometric proportions and which has a non-segregated boron content;
    heating said uniformly mixed residue in an oxidizing atmosphere to a temperature of 1000°-1200° C. to dry and calcine said residue in a single heating step;
    comminuting the calcined residue to a particle size of about 2 microns or less;
    compressing a portion of the comminuted residue under a pressure sufficient to form a briquette having a density of at least about 2.0 grams per cubic centimeter; and
    sintering the briquette at a temperature in excess of about 1000° C. for about 15 to 60 minutes to form a boron-containing strontium ferrite magnet.

* * * * *